(12) United States Patent
Karmi et al.

(10) Patent No.: US 12,579,391 B2
(45) Date of Patent: *Mar. 17, 2026

(54) PROTECTING AGAINST MALICIOUS ATTACKS IN IMAGES

(71) Applicant: QUALCOMM Incorporated, San Diego, CA (US)

(72) Inventors: Gad Karmi, Davis, CA (US); Mark Bapst, South Barrington, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,050

(22) Filed: Dec. 20, 2024

(65) Prior Publication Data

US 2025/0200312 A1 Jun. 19, 2025

Related U.S. Application Data

(63) Continuation of application No. 18/167,787, filed on Feb. 10, 2023, now Pat. No. 12,217,127.

(51) Int. Cl.
| | |
|---|---|
| *G06K 7/14* | (2006.01) |
| *G06F 16/955* | (2019.01) |
| *G06T 19/00* | (2011.01) |
| *H04L 9/32* | (2006.01) |

(52) U.S. Cl.
CPC ....... *G06K 7/1443* (2013.01); *G06F 16/9566* (2019.01); *G06K 7/1417* (2013.01); *G06T 19/006* (2013.01); *H04L 9/3247* (2013.01)

(58) Field of Classification Search
CPC ........... G06F 16/9566; G06F 17/1443; G06K 7/1417; G06T 19/006

USPC .................................................... 235/462.09
See application file for complete search history.

(56) References Cited

U.S. PATENT DOCUMENTS

| | | | |
|---|---|---|---|
| 9,998,926 | B1 | 6/2018 | Gale et al. |
| 10,230,705 | B1 | 3/2019 | Joshi et al. |
| 10,291,738 | B1 | 5/2019 | Jaiswal et al. |
| 11,122,072 | B2 | 9/2021 | Milener et al. |
| 2014/0299660 | A1 | 10/2014 | Melzer |
| 2015/0348329 | A1 | 12/2015 | Carre et al. |
| 2018/0350144 | A1 | 12/2018 | Rathod |
| 2020/0137110 | A1 | 4/2020 | Tyler et al. |
| 2020/0311173 | A1 | 10/2020 | Zhao et al. |
| 2021/0318888 | A1 | 10/2021 | Abbasian et al. |
| 2022/0083660 | A1 | 3/2022 | Todasco et al. |
| 2022/0108008 | A1 | 4/2022 | Bronk et al. |
| 2022/0124171 | A1 | 4/2022 | Peled et al. |
| 2023/0065676 | A1 | 3/2023 | Obstfeld et al. |

(Continued)

OTHER PUBLICATIONS

International Search Report and Written Opinion—PCT/US2024/011867—ISA/EPO—Mar. 19, 2024.

*Primary Examiner* — Allyson N Trail
(74) *Attorney, Agent, or Firm* — QUALCOMM Incorporated

(57) ABSTRACT

Techniques and systems are provided for image processing. For instance, a process can include obtaining, from one or more image sensors, an image of an environment. The process can further include detecting a first visual code in the image; decoding the first visual code; verifying safety of contents of the first visual code; determining that the contents of the first visual code contain a uniform resource locator (URL); and prefetching data linked by the URL based on verifying the safety of the contents of the first visual code.

20 Claims, 10 Drawing Sheets

(56) References Cited

U.S. PATENT DOCUMENTS

| | | |
|---|---|---|
| 2023/0222746 A1 | 7/2023 | Kim et al. |
| 2023/0315243 A1 | 10/2023 | Mossoba et al. |
| 2024/0129580 A1 | 4/2024 | Collins et al. |
| 2024/0273322 A1 | 8/2024 | Karmi et al. |

500

600

700

750

800

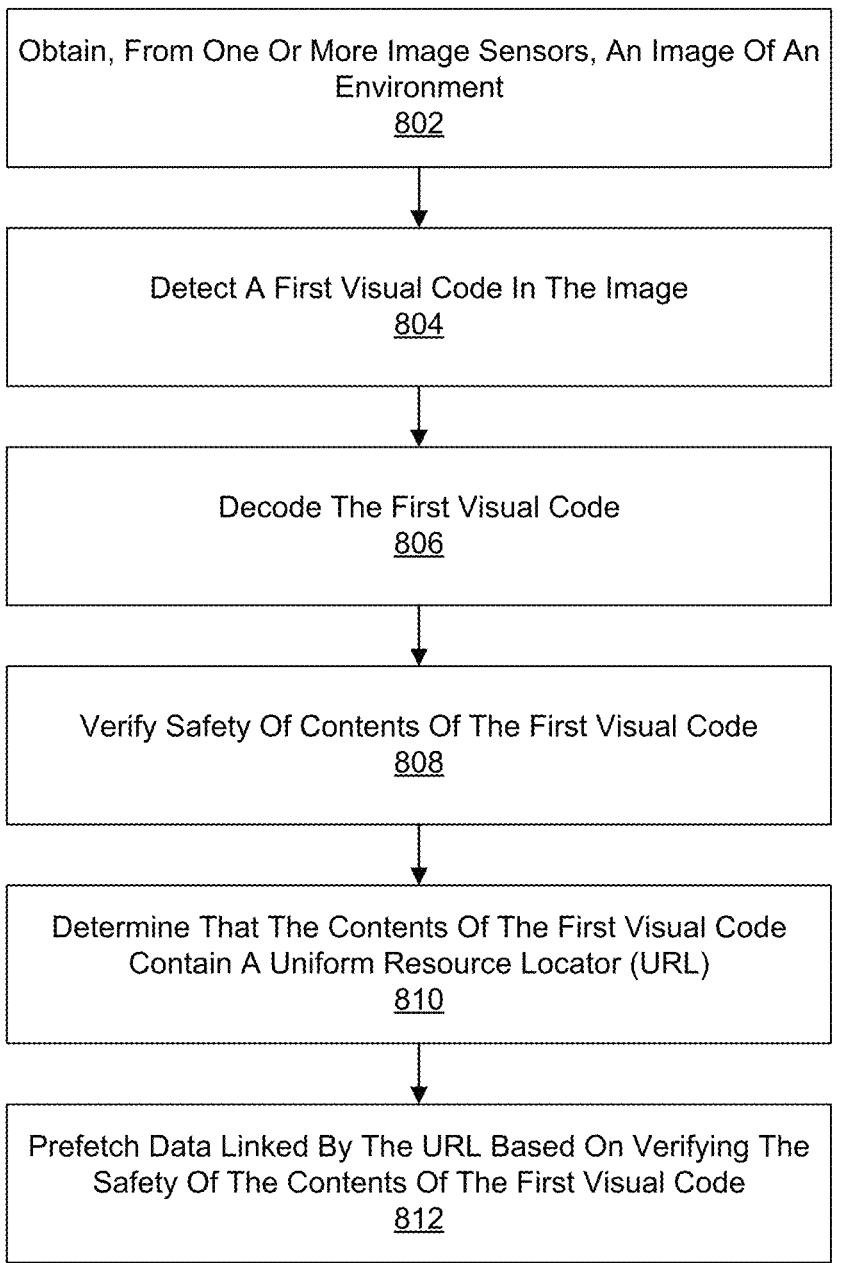

Obtain, From One Or More Image Sensors, An Image Of An
Environment
802

Detect A First Visual Code In The Image
804

Decode The First Visual Code
806

Verify Safety Of Contents Of The First Visual Code
808

Determine That The Contents Of The First Visual Code
Contain A Uniform Resource Locator (URL)
810

Prefetch Data Linked By The URL Based On Verifying The
Safety Of The Contents Of The First Visual Code
812

FIG. 8

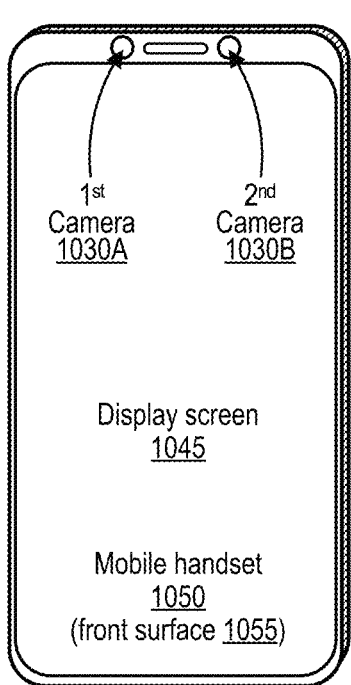
FIG. 10A
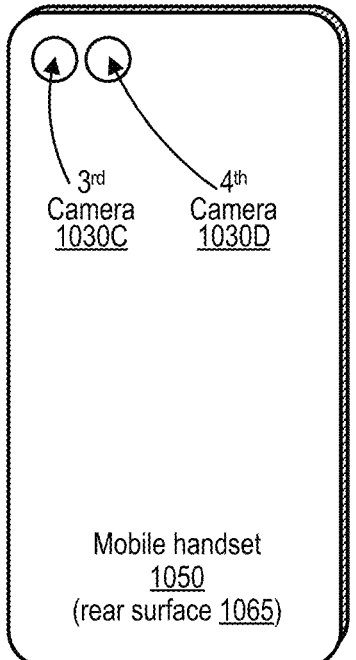
FIG. 10B

PROTECTING AGAINST MALICIOUS ATTACKS IN IMAGES

CROSS-REFERENCED TO RELATED APPLICATIONS

This application is a continuation of U.S. patent application Ser. No. 18/167,787, filed Feb. 10, 2023, which is hereby incorporated by reference in its entirety and for all purposes.

FIELD

This application is related to security for extended reality systems. For example, aspects of the application relate to systems and techniques for protecting against malicious attacks in images.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto images of a real world environment, which can be viewed by a user through an XR device (e.g., a head-mounted display (HMD), extended reality glasses, or other device). For example, an XR device can display an environment to a user. The environment is at least partially different from the real-world environment in which the user is in. The user can generally change their view of the environment interactively, for example by tilting or moving the XR device (e.g., the HMD or other device).

In some cases, an XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. "See-through" or "pass-through" XR systems can be worn by users while the users are engaged in activities in their real-world environment.

In some cases, the XR system can include an eye imaging (also referred to herein as gaze detection or eye tracking) system. In some examples, eyes of the user of an XR system can move over a large range of offset and/or rotation. In some cases, the eyes of a user of an XR system can have different alignment relative to the display.

While the goal of many XR systems is to create realistic, interactive, and fully immersive XR environments, XR systems should also ensure that virtual content does not create potentially malicious situations for users, or otherwise prevent users from properly interacting with the real world environment. Improved XR systems, and image processing systems generally, may be needed for detecting malicious encoded content in the real world environment.

SUMMARY

Systems and techniques are described herein for protecting against malicious attacks in images. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, a method for image processing is provided. The method includes: obtaining, from one or more image sensors, an image of an environment; detecting a first visual code in the image; decoding the first visual code; verifying safety of contents of the first visual code; determining that the contents of the first visual code contain a uniform resource locator (URL); and prefetching data linked by the URL based on verifying the safety of the contents of the first visual code.

In another example, an apparatus for processing video data is provided. The apparatus includes at least one memory and at least one processor (e.g., configured in circuitry) coupled to the at least one memory. The at least one processor is configured to: obtain, from one or more image sensors, an image of an environment; detect a first visual code in the image; decode the first visual code; verify safety of contents of the first visual code; determine that the contents of the first visual code contain a uniform resource locator (URL); and prefetch data linked by the URL based on verifying the safety of the contents of the first visual code.

As another example, a non-transitory computer-readable medium having stored thereon instructions that, when executed by at least one processor, cause the at least one processor to: obtain, from one or more image sensors, an image of an environment; detect a first visual code in the image; decode the first visual code; verify safety of contents of the first visual code; determine that the contents of the first visual code contain a uniform resource locator (URL); and prefetch data linked by the URL based on verifying the safety of the contents of the first visual code.

In another example, an apparatus for image processing, the apparatus including: means for obtaining, from one or more image sensors, an image of an environment; means for detecting a first visual code in the image; means for decoding the first visual code; means for verifying safety of contents of the first visual code; means for determining that the contents of the first visual code contain a uniform resource locator (URL); and means for prefetching data linked by the URL based on verifying the safety of the contents of the first visual code.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 8 is a flow diagram illustrating a process for image processing, in accordance with aspects of the present disclosure.

FIG. 10A is a perspective diagram illustrating a front surface of a mobile device that is configured to perform feature tracking and/or visual simultaneous localization and mapping (VSLAM) using one or more front-facing cameras, in accordance with some examples.

FIG. 10B is a perspective diagram illustrating a rear surface of a mobile device, in accordance with aspects of the present disclosure.

DETAILED DESCRIPTION

Figure 1:
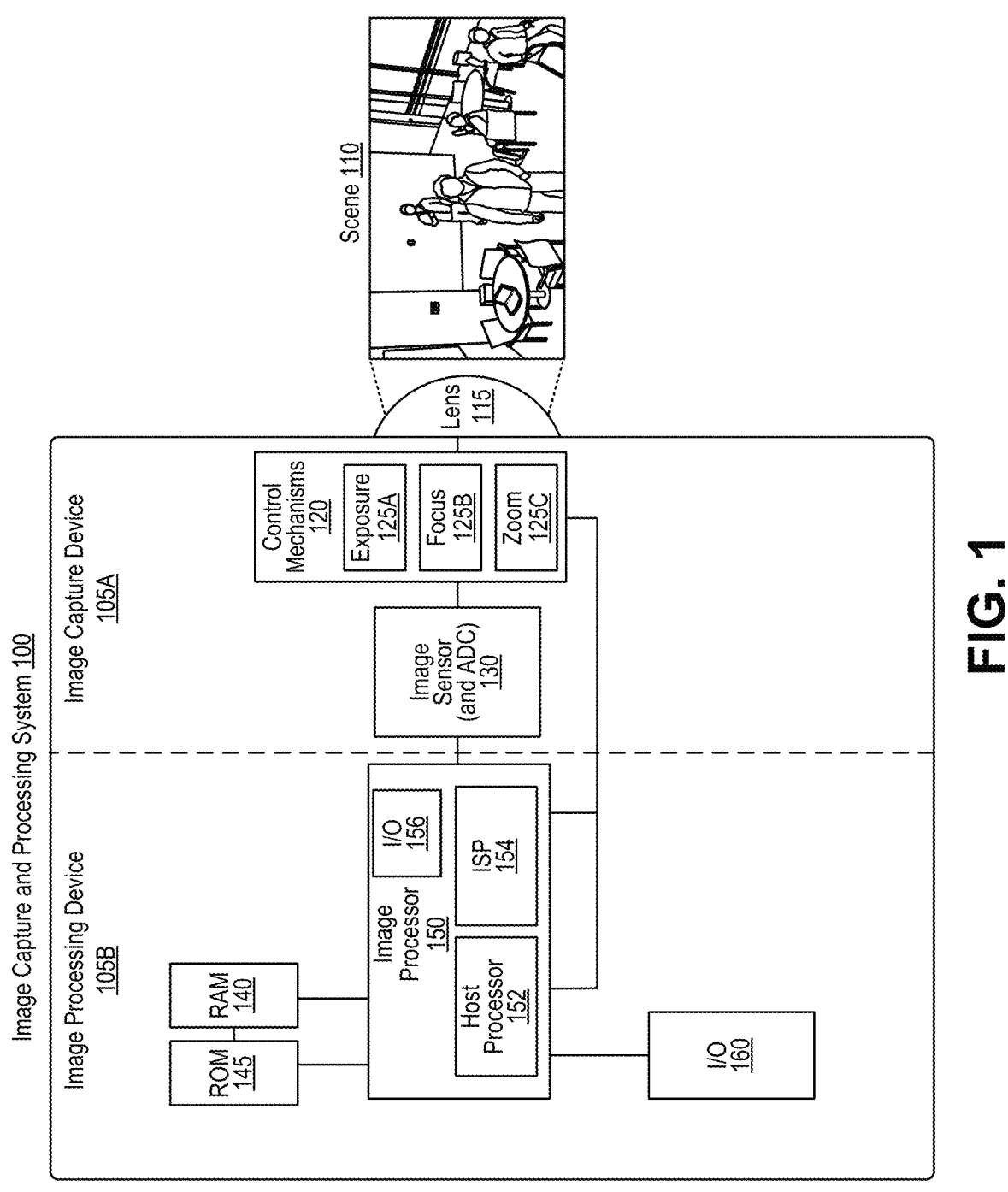
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) superimposed over the user's view of a physical, real-world scene or environment. AR content can include virtual content, such as video, images, graphic content, plaintext, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world (e.g., such as the inside of a building or machine).

In some cases, an XR system may allow a user to interact with an environment around the XR system. To help the user obtain information about the environment, the XR system (or image processing systems generally) may detect and decode encoded information placed in the real environment. In some cases, information may be encoded for placement in the real environment in the form of visual codes, which may be detected by one or more cameras or other sensors of the XR system. For example, information may be encoded in a one or more bar codes and/or quick response (QR) codes, and these codes may be placed around the environment. In some cases, these visual codes may not be visible to a human eye. For example, a QR code may be placed using pigments that are only visible in infrared/near infrared, which may be visible to some sensors of the XR system, but not to the human eye. These visual codes may be detected by the XR system and used to load websites or access other textual information. For example, a visitor to a museum using an XR system (e.g., an HMD, AR glasses, etc.) may direct a sensor of the XR system at a QR code to access a website containing more information about an exhibit. While QR codes are discussed herein as an example of visual codes, it should be understood the techniques discussed herein are applicable to any type of visual code. A visual code may be a method of encoding data into a machine readable, visible format.

While QR codes may offer a convenient and easy way for XR systems to interact with and obtain information associated with a physical environment, QR codes in the environment may be used for potentially malicious purposes. For example, a hacker may cover a legitimate QR code at a restaurant with a malicious QR code. Once scanned by a sensor of an XR system, information encoded in the malicious QR code may redirect the XR system to a malicious website or other undesirable content (e.g., by displaying inappropriate text). Some XR systems may be especially susceptible to such malicious attacks using malicious QR codes. For example, a user using an XR system (e.g., wearing an HMD, AR glasses, etc.) may glance at, and thus, implicitly or explicitly, direct the XR system towards, one or more malicious QR codes, which may cause the information associated with the QR codes to be unintentionally accessed. In some cases, it may be useful to protect against malicious encoded data, such as data encoded into malicious QR codes, in the physical environment for XR or image processing systems. As used herein, malicious content or purposes may refer to content or links to content which may be, intentionally or unintentionally, at least one of dangerous, inappropriate for some users, faulty, harmful, illegal, restricted, undesirable, unwanted, or any other content or links to content a user may want to or may be expected to avoid.

Systems, apparatuses, electronic devices, methods (also referred to as processes), and computer-readable media (collectively referred to herein as "systems and techniques") are described herein for protecting against malicious encoded data for XR or image processing systems. For example, an XR system may process images received by an imaging system to determine if there are QR codes in a received image of a scene. If one or more QR codes are detected in the image of the scene, the QR codes may be decoded. Decoding a visual code may include obtaining data encoded in the visual code, such as by extracting an encoded universal resource locator (URL) or other machine or human readable data from the visual code. If a decoded QR code includes a URL, then the XR system may send the URL to a URL verification service to determine if the URL is malicious. In some cases, the XR system may attempt to prefetch the URLs encoded in detected QR codes in an image, for example by passing the URLs to a proxy server and the proxy server may attempt to verify the URLs. If the URL verification service or proxy server indicates that a URL is malicious, the XR system may replace (e.g., superimpose, overlay, and the like) the QR code in the image with an indication, such as an visual overlay, that the QR code is malicious. Other examples of the indication may include highlighting the QR code in a certain color, blocking the QR code, outlining the QR code, scrambling the QR code, and the like. In some cases, the XR system may disable content from being accessed altogether, for example, such as directed by parental controls. In some cases, the XR system may validate signed URLs if the XR system detects that the QR code includes a signature based on a signing entity also encoded in the QR code. In cases where the QR code encodes plaintext, the XR system may perform semantic analysis of the text.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene 110 toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
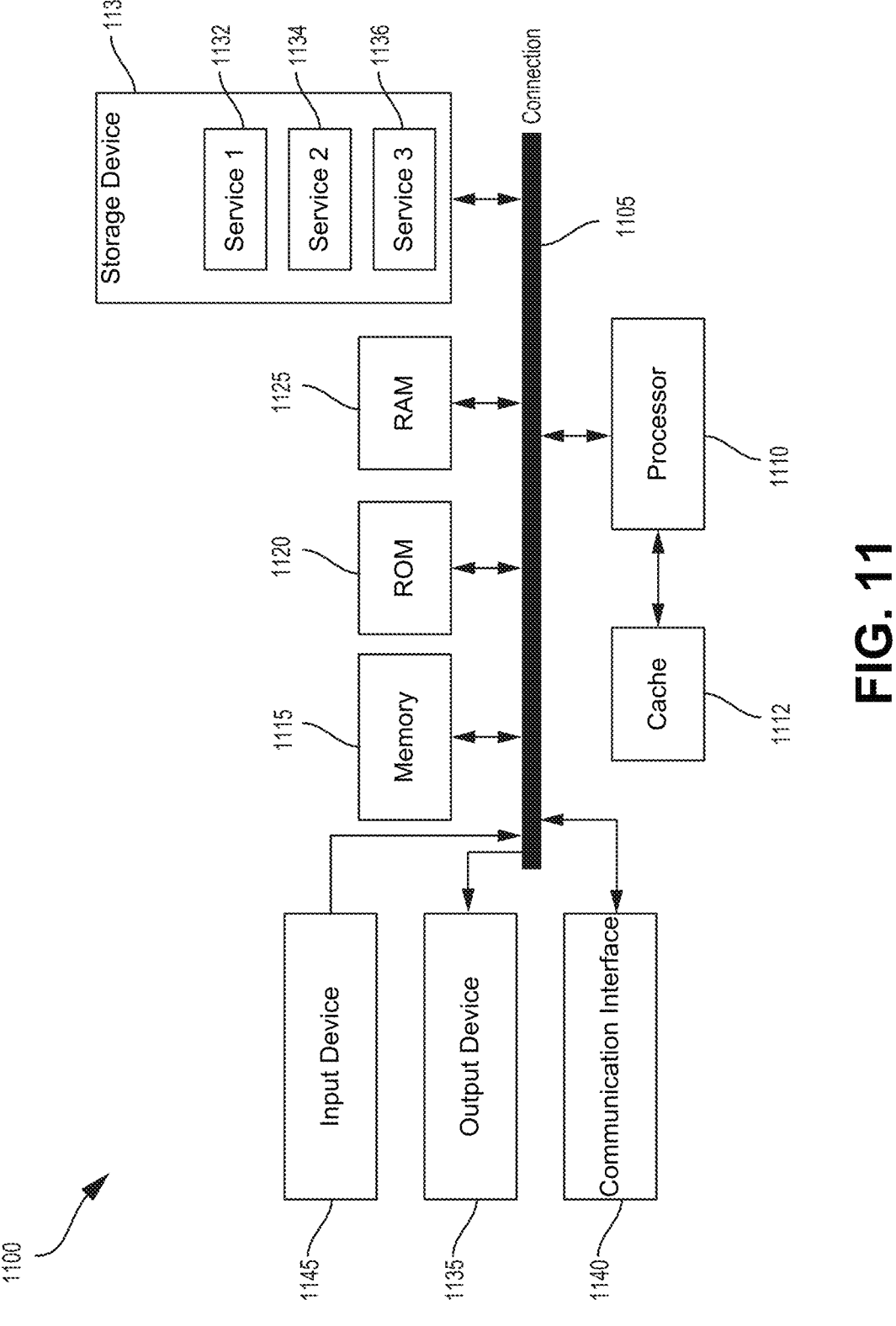
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices

160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
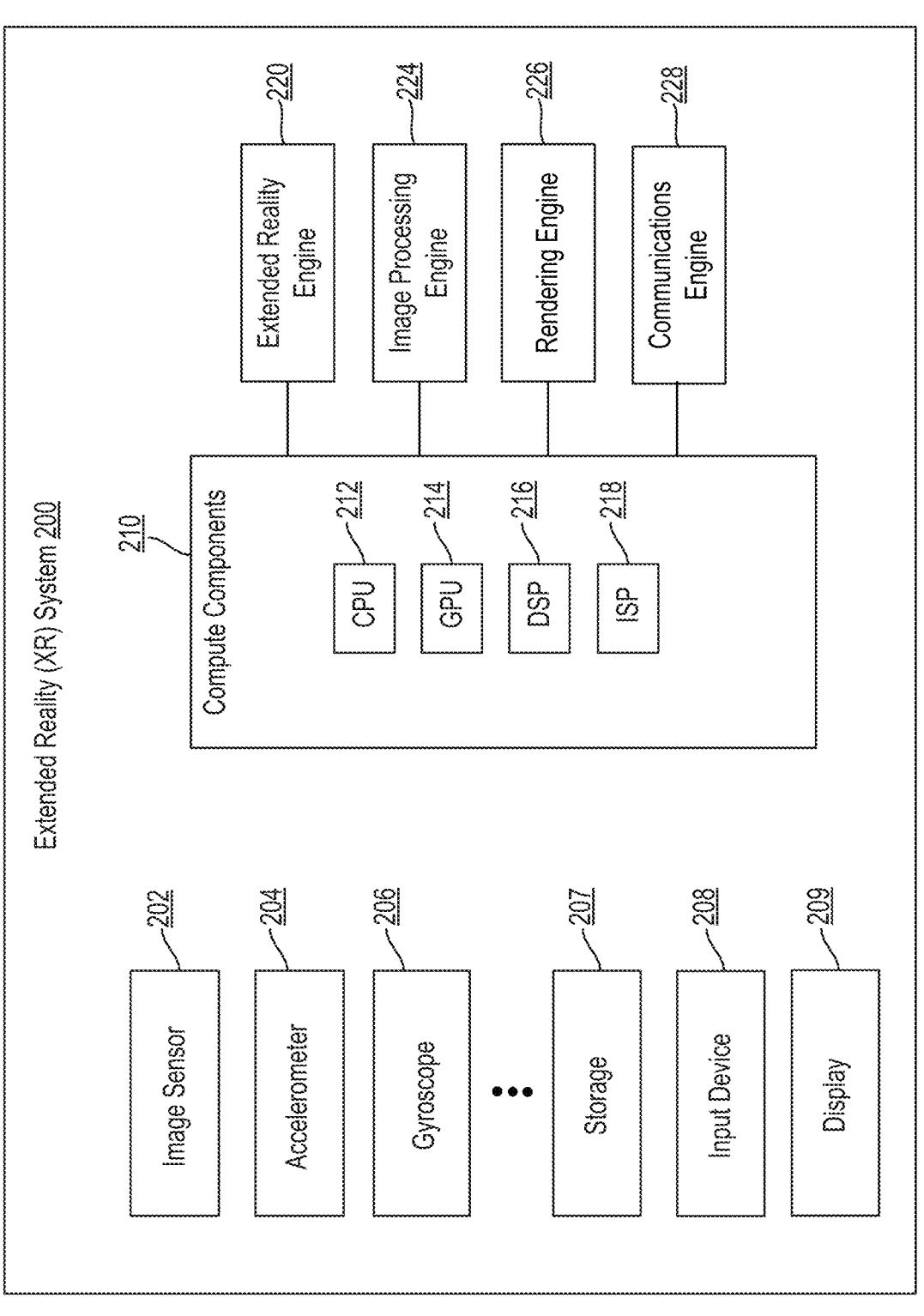
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1140 of FIG. 11.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206

(e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

Figure 4:
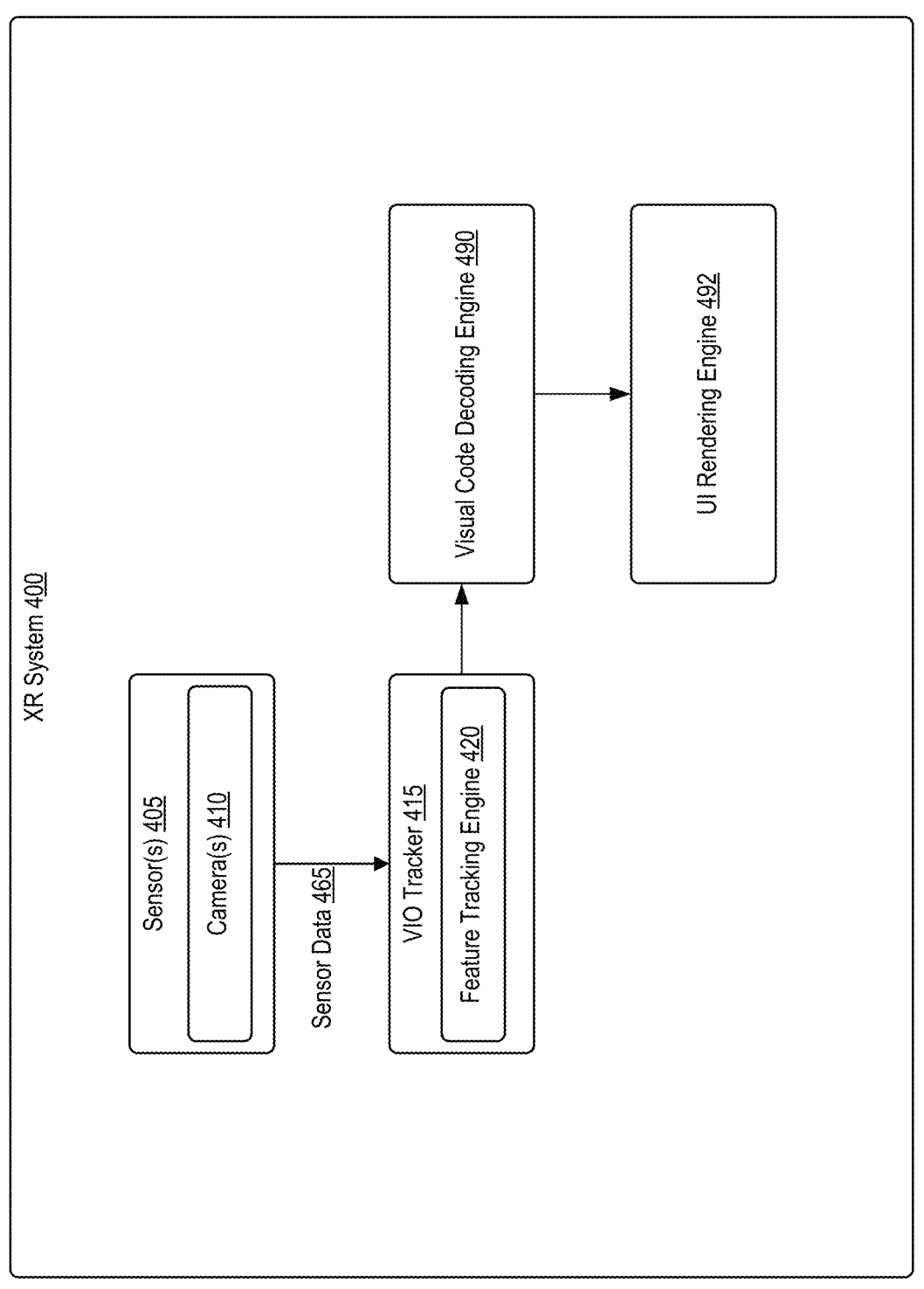
FIG. 4 illustrates an example of an augmented reality enhanced application engine, in accordance with aspects of the present disclosure.
Figure 5:
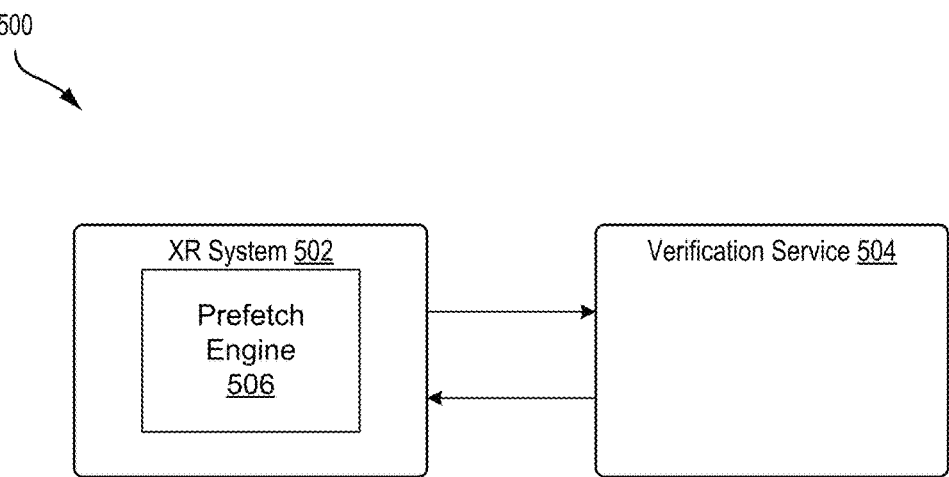
FIG. 5 is a block diagram illustrating protecting against malicious attacks in images using a verification service, in accordance with aspects of the present disclosure.
Figure 9A:
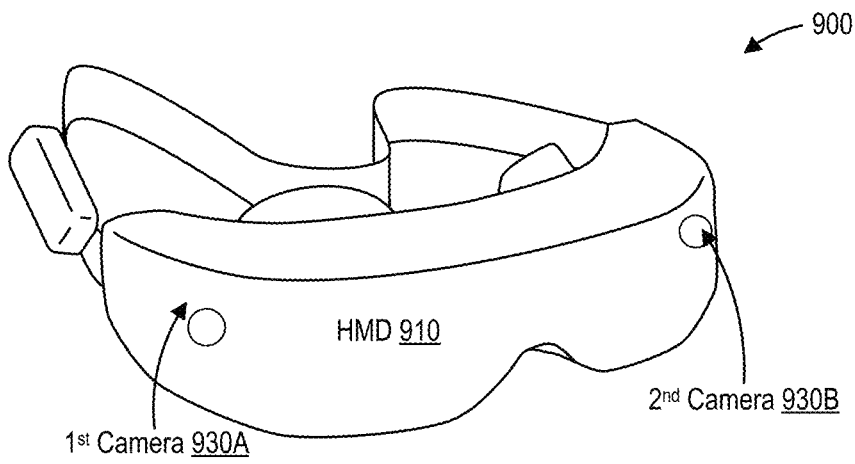
FIG. 9A is a perspective diagram illustrating a head-mounted display (HMD) that performs feature tracking and/or visual simultaneous localization and mapping (VSLAM), in accordance with some examples.
Figure 9B:
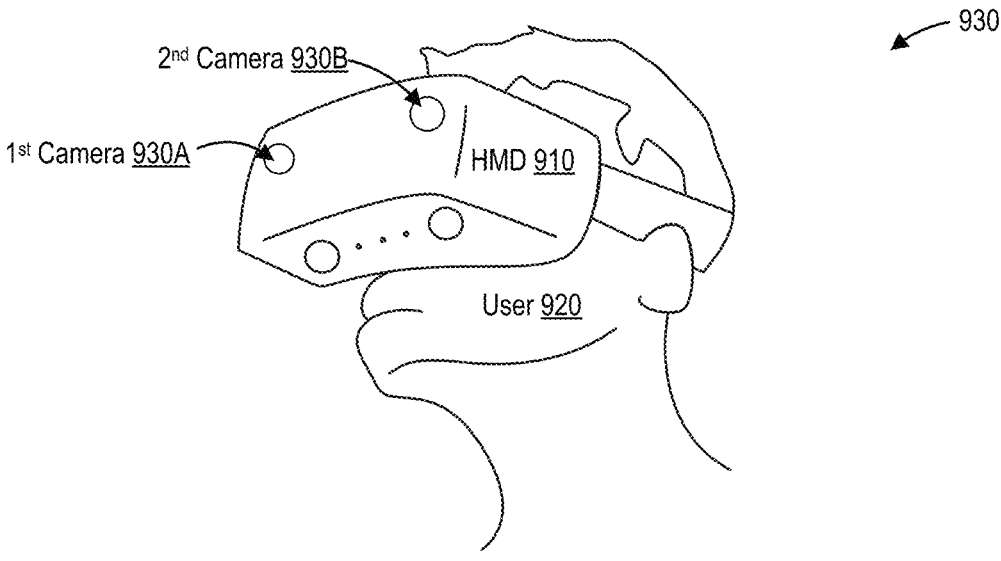
FIG. 9B is a perspective diagram illustrating the head-mounted display (HMD) of FIG. 9A being worn by a user, in accordance with some examples.

As one illustrative example, the compute components 210 can extract feature points corresponding to a device or system (e.g., XR system 400 of FIG. 4, XR system 502 of FIG. 5, the HMD 910 of FIGS. 9A-9B, the mobile handset 1050 of FIG. 10A-B, or the like). In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
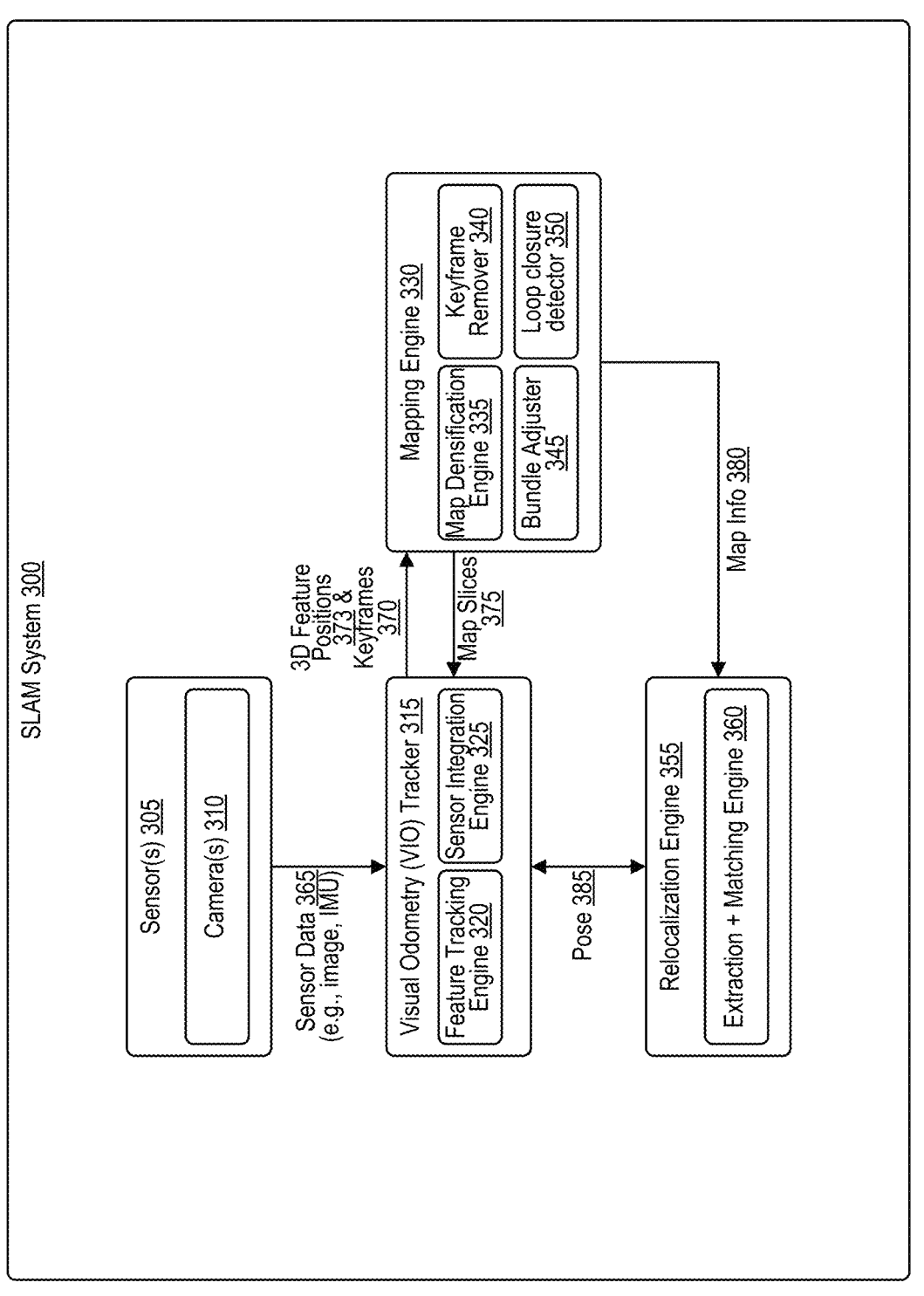
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2 or XR system 400 of FIG. 4. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

FIG. 4 is a block diagram illustrating an architecture of an XR system 400 configured to decode visual codes, in accordance with aspects in the present disclosure. As shown, XR system 400 may include sensors 405, such as one or more cameras 410, which may sense the physical environment when the XR system 400 is in use. The one or more cameras 410 may provide sensor data 465, such as one or more images, to a VIO tracker 415. A feature tracking engine 420 of the VIO tracker 415 may perform feature detection, extraction, and/or tracking based on the sensor data 465. For example, the sensor data 465 may include one or more images which include a visual code. The feature tracking engine 420 may detect the visual code in the sensor data 465. For example, the feature tracking engine 420 may be configured to recognize visually distinctive portions (e.g., features) of the image to detect the visual code. The feature tracking engine 420 may pass information about the detected visual code to a visual code decoding engine 490. For example, the feature tracking engine 420 may pass a portion of the image corresponding to the visual code to the visual code decoding engine 490. The visual code decoding engine 490 may decode the visual code to obtain data encoded in the visual code. For example, the visual code may be encoded according to any visual code, such as a bar code, QR code, and the like and the visual code decoding engine may decode the visual code to identify data encoded within the visual code, such as a position of an object, a URL that points to an image, audio/video content, alphanumeric text, and the like.

In some cases, sensors 405 of the XR system 400 may detect visual code without a user of the XR system 400 directly observing the visual code. For example, the feature tracking engine 420 may detect a visual code if the visual code is within a field of view of the sensors 405 providing the sensor data 465. As an example, the visual codes may be detected when they are in a peripheral view of the user. As other examples, visual codes may be detected using sensors which are facing a different direction than a user of the XR system, or by using sensors which are sensitive to light in a non-VL spectrum of light. In some cases, if an amount of visual code processing becomes prohibitive, the sensor range (e.g., field of view, sensor direction) could be constrained or focused to accommodate resource availability. Conversely, if the compute resources are being under-utilized, the sensor range could be expanded to allow more advanced processing of a wide range of visual codes.

While visual codes can be useful for allowing the user to interact with the environment using an XR system, visual codes may also be used in undesirable or harmful ways. For example, legitimate visual codes may be altered, for example by being covered by a sticker with a different visual code that leads to a malicious website. In some cases, user prompts may be used to help avoid malicious visual codes.

For example, after a visual code is detected, a user of the XR system 400 may be prompted whether to use the data encoded in the visual code. For example, the visual code decoding engine 490 may detect a visual code within a viewing angle of a sensor. The visual code decoding engine 490 may decode the visual code to extract encoded information from the visual code. In some cases, the visual code may include textual information such as plaintext or a URL. The visual code decoding engine 490 may send an indication to a UI rendering engine 492 to prompt the user of the XR system. For example, where the encoded information includes a URL, the user may be presented with the URL and prompted whether to access the URL. Where the encoded information includes plaintext, the prompt may include the text from the visual code.

However, in some cases, users may find it difficult to discern a malicious URL from non-malicious URLs when prompted. Additionally, plaintext including inappropriate text may be displayed in the prompt. Thus, prompting users based on a decoded URL may offer limited security benefits. Further, as XR systems can be expected to more commonly use visual codes to interact with the environment, light-weight and easier to use systems for assessing security risks associated with visual codes may be helpful.

FIG. 5 is a block diagram 500 illustrating protecting against malicious attacks in images using a verification service 504, in accordance with aspects of the present disclosure. To protect against malicious attacks in images, such as through visual codes, an XR system 502 may be configured to verify the decoded visual codes using a verification service 504. In some cases, contents (e.g., information encoded in visual codes) of the visual code may be verified with the verification service 504. For example, after the visual code is decoded, the contents of the visual code may be transmitted to the verification service 504. In some cases, the XR system 502 may be configured to detect visual codes, decode the visual codes, and verify the contents of the visual code with the verification service 504 automatically without an explicit indication (such as from a user of the XR system 502) to focus on and/or access the visual code. In some cases, rather than decoding the visual code and transmitting the contents of the visual code to the verification service 504, the XR system 502 may transmit a portion of the image containing the visual code to the verification service 504 and the verification service 504 may decode the visual code. The verification service 504 may analyze the contents of the visual code and transmit, back to the XR system 502, an indication whether the contents of the visual code are potentially unsafe (e.g., suspicious/malicious/dangerous). As a more specific example, where the contents of the visual code are a URL, the verification service 504 may check the URL against known malicious, potentially harmful, and/or unknown URLs to determine whether to indicate to the XR system 502 that the URL is potentially unsafe. In some cases, the verification service 504 may also apply parental or corporate controls/policies to determine whether to indicate to the XR system 502 that the URL is potentially unsafe. After determining whether the URL is potentially unsafe or not, the verification service 504 may transmit an indication whether the URL is potentially unsafe or not to the XR system 502. In some cases, the verification service 504 may also verify additional information such as phone numbers, addresses, and the like, for example, by using one or more databases.

In some cases, the XR system 502 may attempt to verify each detected visual code in a scene. In some cases, visual codes may be detected in an environment beyond a view visible through a display associate with the XR system 502 (e.g., display 209 of FIG. 2, display screen 1045 of FIG. 10A, and/or output device 1135 of FIG. 11.). For example, an XR system 502 may present a view of an environment in front of the XR system. However, the XR system may also include, for example, side/rear/upward/downward facing cameras that can capture images that may not be displayed in the presented view of the environment.

In some cases, one or more visual codes may be detected based on images from those cameras which are not used in the presented view of the environment, and those visual codes may also be decoded and transmitted to the verification service 504 for verification. In some cases, each detected code may be decoded and transmitted to the verification service 504 for verification. In some cases, a subset of the detected codes may be decoded and transmitted to the verification service 504 for verification. For example, the number of detected codes that may be verified may be limited or expanded based on an amount of resources available, such as processing resources available, communications bandwidth, and the like. Thus, a determination of which codes, of the detected codes can be verified may be made. As an example, a determination of which detected codes may be verified may be based on a current field of view of the presented view, along with those detected codes along a predicated motion of the XR system. Thus, detected codes not in the current field of view and not in the direction of the predicted motion of the XR system may not be verified, while detected codes in the current field of view or in the direction of the prediction motion of the XR system may be verified.

In some cases, a prefetch engine 506 of the XR system 502 may, based on an indication that a URL of a visual code is not unsafe, prefetch data linked to by that URL. The prefetched data may be stored in a storage of the XR system, such as storage 207 of FIG. 2. If the user attempts to access the visual code, then the XR system may access the prefetched data from storage rather than attempting to load the URL via a network. In some cases, accessing the stored prefetched data may be faster than attempting to load the URL and this allows the XR system to be more responsive to the user.

In some cases, each visual code that is determined to be not unsafe (e.g., safe) may be prefetched. In some cases, a subset of the visual codes that are determined to be not unsafe (e.g., safe) may be prefetched. For example, a number of visual codes that are determined to be safe that may be prefetched may be limited or expanded based on an amount of resources available, such as processing resources available, communications bandwidth, available memory, and the like. Thus, a determination of which codes, of the visual codes that are determined to be safe can be prefetched may be made. As an example, a determination of which visual codes that are determined to be safe may be prefetched may be based on a current field of view of the presented view, along with those visual codes that are determined to be safe along a predicated motion of the XR system. Thus, visual codes that are determined to be safe not in the current field of view and not in the direction of the predicted motion of the XR system may not be prefetched, while visual codes that are determined to be safe in the current field of view or in the direction of the prediction motion of the XR system may be prefetched.

As another example, where the contents of the visual code are plaintext, the verification service 504 may perform semantic analysis, dictionary lookups, word lists, and the like, to determine whether to indicate to the XR system 502 that the plaintext, or portions thereof, may be potentially inappropriate, profane, etc. In such cases, the potentially inappropriate plaintext may be altered. For example, the potentially inappropriate plaintext may be blurred/blocked/removed/edited/etc.

In some cases, the verification service 504 may be executing locally on the XR system. In other cases, the verification service 504 may be a service provided by an online (e.g., cloud) provider and accessed via a network. Examples of the verification service 504 may include proxy services (e.g., proxy server), URL scanning services, URL white/blacklists, and the like.

Figure 6:
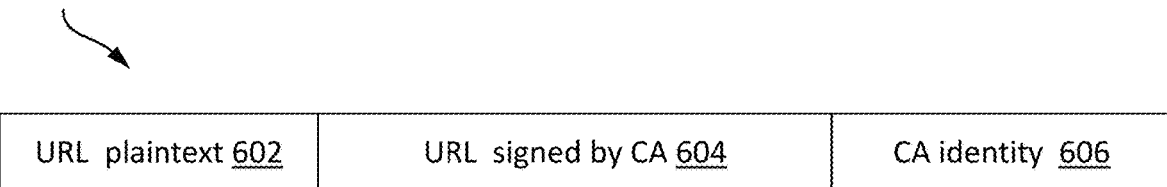
FIG. 6 is a block diagram illustrating signed contents of a visual code, in accordance with aspects of the present disclosure.

FIG. 6 is a block diagram illustrating signed contents 600 of a visual code, in accordance with aspects of the present disclosure. In some cases, an XR system may protect against malicious attacks in images, such as through visual codes, by verifying that the contents 600 of the visual code is digitally signed. For example, for a detected visual code, the XR system may decode the visual code to obtain contents 600 of the visual code. In some cases, the contents 600 of the visual code may include at least three sections. A first section may include plaintext through which the XR system may use to act on the visual code. For example, the first section may include a plaintext URL 602 that the XR system may access. In other cases, the first section may include other plaintext, data, or other information as defined by the visual code. A second section may include a signature 604 from a certificate authority (CA) (e.g., signing authority) based on the plaintext URL 602. For example, the signature 604 may be based on a hash of the plaintext URL 602 that is signed by a CA using a private key of the CA. A third section of the contents 600 of the visual code may include an indication of an identity of the CA 606.

In some cases, prior to using the contents 600 (e.g., by accessing a URL, displaying plaintext, etc.), the XR system may verify the contents 600. As an example, the XR system may verify the contents 600 of the visual code by checking the third section to obtain the indicated identity of the CA 606. In some cases, the XR system may check the indicated identity of the CA 606 against a list of trusted CAs. If the indicated identity of the CA 606 is not in the list of trusted CAs, the XR system may mark the visual code as potentially unsafe. If the indicated identity of the CA 606 is in the list of trusted CAs, the XR system may continue to verify the contents 600 of the visual code. Based on the indicated identity of the CA 606, the XR system may obtain a public key of the CA. The XR system may then decode the signature based on the public key of the CA to verify the URL. If the XR system cannot verify the URL, then the XR system may mark the visual code as unsafe. If the XR system can verify the URL, then the XR system may mark the visual code as safe (e.g., not unsafe, verified).

Figure 7A:
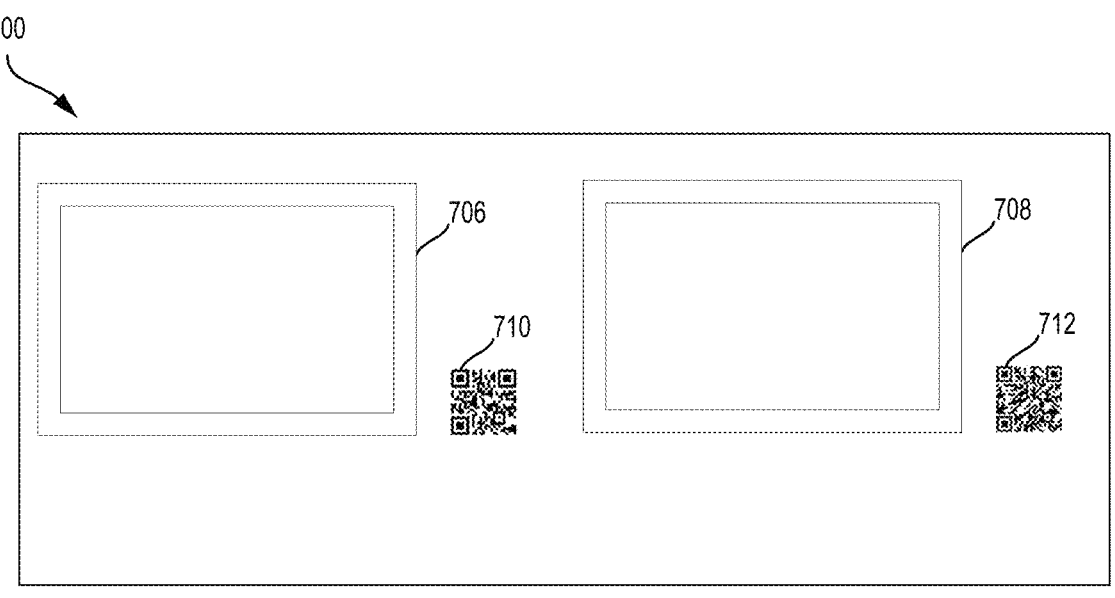
FIGS. 7A and 7B illustrate automatic verification of visual codes, in accordance with aspects of the present disclosure.
Figure 7B:
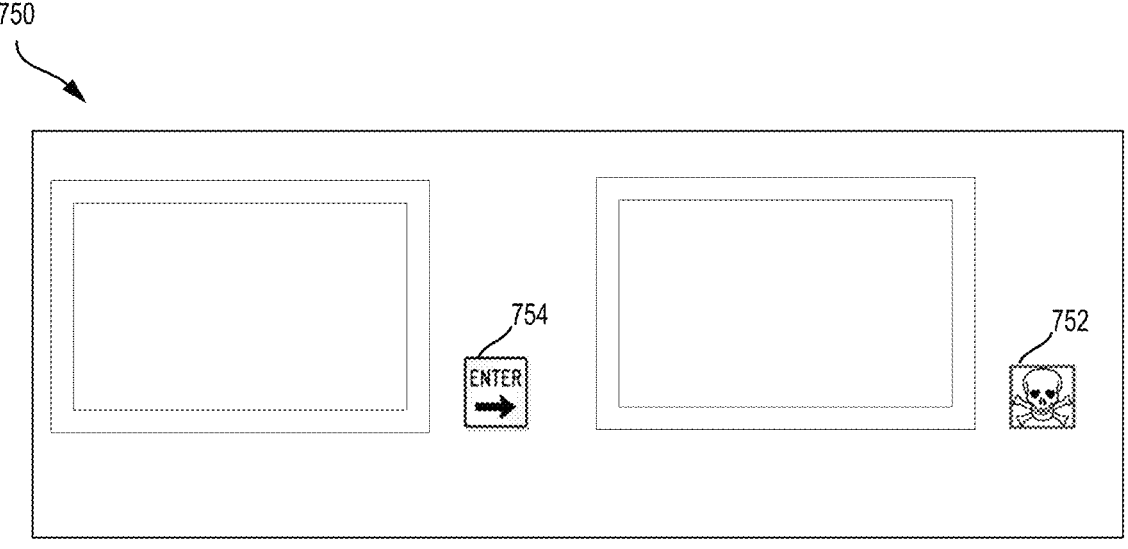

FIGS. 7A and 7B illustrate automatic verification of visual codes, in accordance with aspects of the present disclosure. In some cases, to help enhance a user experience for handling visual codes with XR systems, visual codes may be automatically verified. As an example, in scene 700 of FIG. 7A, may be a composite view of the physical environment along with virtual objects. Here, scene 700 includes two physical objects, a first painting 706 and a second painting 708. The first painting 706 may be associated with a first visual code 710 (a QR code in this example) in the physical environment, and the second painting 708 may be associated with a second visual code 712 in the physical environment.

In some cases, the XR system may detect visual codes with a field of view of one or more sensors of the XR system and these visual codes may be detected without a user of the XR system directly focusing on (e.g., observing) the visual code. In some cases, after detecting a visual code, the XR system may attempt to verify the detected visual code without input from the user. For example, the XR system may attempt to verify the detected visual code via a verification service, such as described in FIG. 5, the XR system may attempt to verify the detected visual code via a signature, such as described in FIG. 6, or the XR system may attempt to verify the detected visual code using a combination of verification techniques. Based on the verification result, visual codes may be marked (e.g., determined to be), for example as potentially unsafe, or safe (e.g., not unsafe, verified).

In some cases, visual codes which are marked as potentially unsafe may be replaced in scene 750 with a first graphical indication 752 indicating that the visual code may be potentially unsafe. In some cases, the graphical indication may be a graphical icon, indicator, highlight, border, color, or other virtual object that may be overlaid over, around, next to, about, etc., the visual code in the physical environment by the XR system. In some cases, if the user attempts to access visual codes which are marked potentially unsafe, the user access attempt may be blocked and/or warnings may be displayed to the user.

In some cases, visual codes which are marked as safe (e.g., not unsafe, verified) may be replaced in scene 750 with a second graphical indication 754. The second graphical indication 754 may indicate that the visual code is not unsafe. In some cases, the second graphical indication 754 may also help highlight the presence of the visual code to help the user interact with virtual content associated with the physical environment. In some cases, different graphical indications for visual codes which are marked as safe may be used as compared to visual codes which are marked as potentially unsafe. For example, visual codes which are marked as safe may be highlighted with a colored border, or not marked at all, while visual codes which are marked as potentially unsafe may be replaced in the scene 750.

In some cases, the graphical (e.g., visual) indications, such as the first graphical indication 752 and second graphical indication 754, may be generated (e.g., placed, output, inserted, overlayed, and the like) in the scene 750 ahead of time, or just in time. For example, where the graphical indications are placed ahead of time, the visual codes may be replaced as the determination whether the visual code is safe or unsafe. As another example, where the graphical indications are placed just in time, the graphical indications may be presented in the scene 750 when activation of the visual code is attempted, or when focus (e.g., via gaze tracking) is placed on the visual code.

FIG. 8 is a flow diagram illustrating a process 800 for image processing, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors.

At block 802, the computing device (or component thereof) may obtain, from one or more image sensors (e.g., imaging sensor 202 of FIG. 2, cameras 1030A, 1030B of FIGS. 10A, 10B), an image of an environment.

At block 804, the computing device (or component thereof) may detect a first visual code in the image. In some cases, the first visual code is detected in an image of a portion of the environment that is not within a field of view a display (e.g., a display associated with the XR device, such as display 209 of FIG. 2, display screen 1045 of FIG. 10A, and/or output device 1135 of FIG. 11.). At block 806, the computing device (or component thereof) may decode the first visual code. In some cases, the first visual code comprises a quick response (QR) code At block 808, the computing device (or component thereof) may verify safety of contents of the first visual code. In some cases, the computing device (or component thereof) may detect a second visual code in the image. In some cases, the computing device (or component thereof) may decode the second visual code. In some cases, the computing device (or component thereof) may determine that contents of the second visual code are malicious. In some cases, the computing device (or component thereof) may generate a visual indication that the second visual code in the image is potentially malicious. In some cases, the computing device (or component thereof) may output the visual indication for display. In some cases, the visual indication that the first visual code is potentially malicious comprises an overlay for the second visual code indicating that the second visual code is potentially malicious. In some cases, the computing device (or component thereof) may generate a visual indication indicating that safety of the contents of the first visual code in the image is verified. In some cases, the computing device (or component thereof) may output the visual indication for display. In some cases, to verify the safety of the contents of the first visual code the computing device (or component thereof) may transmit the contents of the first visual code to a verification service. In some cases, to verify the safety of the contents of the first visual code the computing device (or component thereof) may receive, from the verification service, an indication that the safety of the contents of the first visual code is verified. In some cases, the verification service comprises at least one of a URL verification service or a proxy server. In some cases, to verify the safety of the contents of the first visual code, the computing device (or component thereof) may determine that the contents of the first visual code are potentially safe. In some cases, the verification service or proxy server may verify one or more portions of the URL.

In some cases, to verify the safety of the contents of the first visual code, the computing device (or component thereof) may determine that the first visual code is signed. In some cases, to verify the safety of the contents of the first visual code, the computing device (or component thereof) may determine that the first visual code includes an indication of a signing authority. In some cases, to verify the safety of the contents of the first visual code, the computing device (or component thereof) may verify the safety of the contents of the first visual code based on the indication of the signing authority.

In some cases, the computing device (or component thereof) may detect a third visual code in the image. In some cases, the computing device (or component thereof) may decode the third visual code. In some cases, the computing device (or component thereof) may determine that contents of the third visual code contain textual information. In some cases, the computing device (or component thereof) may determine whether the textual information is potentially inappropriate. In some cases, the computing device (or component thereof) may perform at least one of: output for display the textual information based on a determination that contents of the third visual code are not potentially inappropriate or output for display an altered version of the textual information based on a determination that contents of the third visual code are potentially inappropriate.

At block 810, the computing device (or component thereof) may determine that the contents of the first visual code contain a uniform resource locator (URL).

At block 812, the computing device (or component thereof) may prefetch data linked by the URL based on verifying the safety of the contents of the first visual code.

In some cases, the computing device (or component thereof) may prefetch the data absent a request by a user to access the URL.

FIG. 9A is a perspective diagram 900 illustrating a head-mounted display (HMD) 910 that performs feature tracking and/or visual simultaneous localization and mapping (VSLAM), in accordance with some examples. The HMD 910 may be, for example, an augmented reality (AR) headset, a virtual reality (VR) headset, a mixed reality (MR) headset, an extended reality (XR) headset, or some combination thereof. The HMD 910 may be an example of an XR system 200, a SLAM system 300, or a combination thereof. The HMD 910 includes a first camera 930A and a second camera 930B along a front portion of the HMD 910. The first camera 930A and the second camera 930B may be two of the one or more cameras 39. In some examples, the HMD 910 may only have a single camera. In some examples, the HMD 910 may include one or more additional cameras in addition to the first camera 930A and the second camera 930B. In some examples, the HMD 910 may include one or more additional sensors in addition to the first camera 930A and the second camera 930B.

FIG. 9B is a perspective diagram 930 illustrating the head-mounted display (HMD) 910 of FIG. 9A being worn by a user 920, in accordance with some examples. The user 920 wears the HMD 910 on the user 920's head over the user 920's eyes. The HMD 910 can capture images with the first camera 930A and the second camera 930B. In some examples, the HMD 910 displays one or more display images toward the user 920's eyes that are based on the images captured by the first camera 930A and the second camera 930B. The display images may provide a stereoscopic view of the environment, in some cases with information overlaid and/or with other modifications. For example, the HMD 910 can display a first display image to the user 920's right eye, the first display image based on an image captured by the first camera 930A. The HMD 910 can display a second display image to the user 920's left eye, the second display image based on an image captured by the second camera 930B. For instance, the HMD 910 may provide overlaid information in the display images overlaid over the images captured by the first camera 930A and the second camera 930B.

The HMD 910 may include no wheels, propellers or other conveyance of its own. Instead, the HMD 910 relies on the movements of the user 920 to move the HMD 910 about the environment. In some cases, for instance where the HMD 910 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 910, such as a remote server or console associated with a video game or video game platform. In some cases, feature tracking and/or SLAM may be performed in a virtual environment even by a vehicle or other device that has its own physical conveyance system that allows it to physically move about a physical environment. For example, SLAM may be performed in a virtual environment to test whether a SLAM system 300 is working properly without wasting time or energy on movement and without wearing out a physical conveyance system.

FIG. 10A is a perspective diagram 1000 illustrating a front surface 1055 of a mobile device 1050 that performs features described here, including, for example, feature tracking and/or visual simultaneous localization and mapping (VSLAM) using one or more front-facing cameras 1030A-B, in accordance with some examples. The mobile device 1050 may be, for example, a cellular telephone, a satellite phone, a portable gaming console, a music player, a health tracking device, a wearable device, a wireless communication device, a laptop, a mobile device, any other type of computing device or computing system 1300 discussed herein, or a combination thereof. The front surface 1055 of the mobile device 1050 includes a display screen 1045. The front surface 1055 of the mobile device 1050 includes a first camera 1030A and a second camera 1030B. The first camera 1030A and the second camera 1030B are illustrated in a bezel around the display screen 1045 on the front surface 1055 of the mobile device 1050. In some examples, the first camera 1030A and the second camera 1030B can be positioned in a notch or cutout that is cut out from the display screen 1045 on the front surface 1055 of the mobile device 1050. In some examples, the first camera 1030A and the second camera 1030B can be under-display cameras that are positioned between the display screen 1045 and the rest of the mobile device 1050, so that light passes through a portion of the display screen 1045 before reaching the first camera 1030A and the second camera 1030B. The first camera 1030A and the second camera 1030B of the perspective diagram 1000 are front-facing cameras. The first camera 1030A and the second camera 1030B face a direction perpendicular to a planar surface of the front surface 1055 of the mobile device 1050. The first camera 1030A and the second camera 1030B may be two of the one or more cameras 310. In some examples, the front surface 1055 of the mobile device 1050 may only have a single camera. In some examples, the mobile device 1050 may include one or more additional cameras in addition to the first camera 1030A and the second camera 1030B. In some examples, the mobile device 1050 may include one or more additional sensors in addition to the first camera 1030A and the second camera 1030B.

FIG. 10B is a perspective diagram 1090 illustrating a rear surface 1065 of a mobile device 1050. The mobile device 1050 includes a third camera 1030C and a fourth camera 1030D on the rear surface 1065 of the mobile device 1050. The third camera 1030C and the fourth camera 1030D of the perspective diagram 1090 are rear-facing. The third camera 1030C and the fourth camera 1030D face a direction perpendicular to a planar surface of the rear surface 1065 of the mobile device 1050. While the rear surface 1065 of the mobile device 1050 does not have a display screen 1045 as illustrated in the perspective diagram 1090, in some examples, the rear surface 1065 of the mobile device 1050 may have a second display screen. If the rear surface 1065 of the mobile device 1050 has a display screen 1045, any positioning of the third camera 1030C and the fourth camera 1030D relative to the display screen 1045 may be used as discussed with respect to the first camera 1030A and the second camera 1030B at the front surface 1055 of the mobile device 1050. The third camera 1030C and the fourth camera 1030D may be two of the one or more cameras 310. In some examples, the rear surface 1065 of the mobile device 1050 may only have a single camera. In some examples, the mobile device 1050 may include one or more additional cameras in addition to the first camera 1030A, the second camera 1030B, the third camera 1030C, and the fourth camera 1030D. In some examples, the mobile device 1050 may include one or more additional sensors in addition to the first camera 1030A, the second camera 1030B, the third camera 1030C, and the fourth camera 1030D.

Like the HMD 910, the mobile device 1050 includes no wheels, propellers, or other conveyance of its own. Instead, the mobile device 1050 relies on the movements of a user holding or wearing the mobile device 1050 to move the mobile device 1050 about the environment. In some cases, for instance where the mobile device 1050 is used for AR, VR, MR, or XR, the environment may be entirely or partially virtual. In some cases, the mobile device 1050 may be slotted into a head-mounted device (HMD) (e.g., into a cradle of the HMD) so that the mobile device 1050 functions as a display of the HMD, with the display screen 1045 of the mobile device 1050 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1050.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, camera, accelerometers, gyroscopes, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/Re-RAM), phase change memory (PCM), spin transfer torque RAM (STT-RAM), another memory chip or cartridge, and/ or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. A method for image processing, comprising: obtaining, from one or more image sensors, an image of an environment; detecting a first visual code in the image; decoding the first visual code; verifying safety of contents of the first visual code; determining that the contents of the first visual code contain a uniform resource locator (URL); and prefetching data linked by the URL based on verifying the safety of the contents of the first visual code.

Aspect 2. The method of Aspect 1, further comprising: detecting a second visual code in the image; decoding the second visual code; determining that contents of the second visual code are malicious; generating a visual indication that the second visual code in the image is potentially malicious; and outputting the visual indication for display.

Aspect 3. The method of Aspect 2, wherein the visual indication that the first visual code is potentially malicious comprises an overlay for the second visual code indicating that the second visual code is potentially malicious.

Aspect 4. The method of any one of Aspects 1 to 3, further comprising: generating a visual indication indicating that safety of the contents of the first visual code in the image is verified; and outputting the visual indication for display.

Aspect 5. The method of any one of Aspects 1 to 4, wherein verifying the safety of the contents of the first visual code comprises: transmitting the contents of the first visual code to a verification service; and receiving, from the verification service, an indication that the safety of the contents of the first visual code is verified.

Aspect 6. The method of Aspect 5, wherein the verification service comprises at least one of a URL verification service or a proxy server.

Aspect 7. The method of any one of Aspects 1 to 6, wherein verifying the safety of the contents of the first visual code comprises: determining that the first visual code is signed; determining that the first visual code includes an indication of a signing authority; and verifying the safety of the contents of the first visual code based on the indication of the signing authority.

Aspect 8. The method of any one of Aspects 1 to 7, further comprising: detecting a third visual code in the image; decoding the third visual code; determining that contents of the third visual code contain textual information; determining whether the textual information is potentially inappropriate; and performing at least one of: outputting for display the textual information based on a determination that contents of the third visual code are not potentially inappropriate; or outputting for display an altered version of the textual information based on a determination that contents of the third visual code are potentially inappropriate.

Aspect 9. The method of any one of Aspects 1 to 8, wherein the first visual code comprises a quick response (QR) code.

Aspect 10. The method of any one of Aspects 1 to 9, wherein the prefetching is performed absent a request by a user to access the URL.

Aspect 11. The method of any one of Aspects 1 to 10, wherein verifying the safety of the contents of the first visual code comprises determining that the contents of the first visual code are potentially safe.

Aspect 12. An apparatus for image processing, the apparatus comprising: at least one memory; and at least one processor coupled to the at least one memory, the at least one processor being configured to: obtain, from one or more image sensors, an image of an environment; detect a first visual code in the image; decode the first visual code; verify safety of contents of the first visual code; determine that the contents of the first visual code contain a uniform resource locator (URL); and prefetch data linked by the URL based on verifying the safety of the contents of the first visual code.

Aspect 13. The apparatus of Aspect 12, wherein the at least one processor is further configured to: detect a second visual code in the image; decode the second visual code; determine that contents of the second visual code are malicious; generate a visual indication that the second visual code in the image is potentially malicious; and output the visual indication for display.

Aspect 14. The apparatus of Aspect 13, wherein the visual indication that the first visual code is potentially malicious comprises an overlay for the second visual code indicating that the second visual code is potentially malicious.

Aspect 15. The apparatus of any one of Aspects 12 to 14, wherein the at least one processor is further configured to: generate a visual indication indicating that safety of the contents of the first visual code in the image is verified; and output the visual indication for display.

Aspect 16. The apparatus of any one of Aspects 12 to 15, wherein, to verify the safety of the contents of the first visual code, the at least one processor is configured to: transmit the contents of the first visual code to a verification service; and receive, from the verification service, an indication that the safety of the contents of the first visual code is verified.

Aspect 17. The apparatus of Aspect 16, wherein the verification service comprises at least one of a URL verification service or a proxy server.

Aspect 18. The apparatus of any one of Aspects 12 to 17, wherein, to verify the safety of the contents of the first visual code, the at least one processor is configured to: determine that the first visual code is signed; determine that the first visual code includes an indication of a signing authority; and verify the safety of the contents of the first visual code based on the indication of the signing authority.

Aspect 19. The apparatus of any one of Aspects 12 to 18, wherein the at least one processor is further configured to: detect a third visual code in the image; decode the third visual code; determine that contents of the third visual code contain textual information; determine whether the textual information is potentially inappropriate; and perform at least one of: output for display the textual information based on a determination that contents of the third visual code are not potentially inappropriate; or output for display an altered version of the textual information based on a determination that contents of the third visual code are potentially inappropriate.

Aspect 20. The apparatus of any one of Aspects 12 to 19, wherein the first visual code comprises a quick response (QR) code.

Aspect 21. The apparatus of any one of Aspects 12 to 20, wherein the at least one processor is further configured to prefetch the data absent a request by a user to access the URL.

Aspect 22. The apparatus of any one of Aspects 12 to 21, wherein, to verify the safety of the contents of the first visual code, the at least one processor is configured to determine that the contents of the first visual code are potentially safe.

Aspect 23. A non-transitory computer-readable medium having stored thereon instructions that, when executed by at least one processor, cause the at least one processor to: obtain, from one or more image sensors, an image of an environment; detect a first visual code in the image; decode the first visual code; verify safety of contents of the first visual code; determine that the contents of the first visual code contain a uniform resource locator (URL); and prefetch data linked by the URL based on verifying the safety of the contents of the first visual code.

Aspect 24. The non-transitory computer-readable medium of Aspect 23, wherein the instructions further cause the at least one processor to: detect a second visual code in the image; decode the second visual code; determine that contents of the second visual code are malicious; generate a visual indication that the second visual code in the image is potentially malicious; and output the visual indication for display.

Aspect 25. The non-transitory computer-readable medium of Aspect 24, wherein the visual indication that the first visual code is potentially malicious comprises an overlay for the second visual code indicating that the second visual code is potentially malicious.

Aspect 26. The non-transitory computer-readable medium of any one of Aspects 23 to 25, wherein the instructions further cause the at least one processor to: generate a visual indication indicating that safety of the contents of the first visual code in the image is verified; and output the visual indication for display.

Aspect 27. The non-transitory computer-readable medium of any one of Aspects 23 to 26, wherein, to verify the safety of the contents of the first visual code, the instructions further cause the at least one processor to: transmit the contents of the first visual code to a verification service; and receive, from the verification service, an indication that the safety of the contents of the first visual code is verified.

Aspect 28. The non-transitory computer-readable medium of Aspect 27, wherein the verification service comprises at least one of a URL verification service or a proxy server.

Aspect 29. The non-transitory computer-readable medium of any one of Aspects 23 to 28, wherein, to verify the safety of the contents of the first visual code, the instructions further cause the at least one processor to: determine that the first visual code is signed; determine that the first visual code includes an indication of a signing authority; and verify the safety of the contents of the first visual code based on the indication of the signing authority.

Aspect 30. The non-transitory computer-readable medium of any one of Aspects 23 to 29, wherein the instructions further cause the at least one processor to: detect a third visual code in the image; decode the third visual code; determine that contents of the third visual code contain textual information; determine whether the textual information is potentially inappropriate; and perform at least one of: output for display the textual information based on a determination that contents of the third visual code are not potentially inappropriate; or output for display an altered version of the textual information based on a determination that contents of the third visual code are potentially inappropriate.

Aspect 31. The non-transitory computer-readable medium of any one of Aspects 23 to 30, wherein the first visual code comprises a quick response (QR) code.

Aspect 32. The non-transitory computer-readable medium of any one of Aspects 23 to 31, wherein the instruction cause the at least one processor to prefetch the data absent a request by a user to access the URL.

Aspect 33. The non-transitory computer-readable medium of any one of Aspects 23 to 32, wherein, to verify the safety of the contents of the first visual code, the instructions further cause the at least one processor to determine that the contents of the first visual code are potentially safe.

Aspect 34: An apparatus for image processing, comprising means for performing one or more of operations according to any of Aspects 1 to 11, 35, and 37.

Aspect 35: The method of Aspect 1, wherein the first visual code is detected in an image of a portion of the environment that is not within a field of view a display.

Aspect 36: The apparatus of Aspect 13, wherein the first visual code is detected in an image of a portion of the environment that is not within a field of view a display.

Aspect 37: The method of Aspect 35, further comprising determining whether to prefetch the first visual code when the first visual code is not within the field of view of the display.

Aspect 38: The method of Aspect 36, wherein the at least one processor is further configured to determine whether to prefetch the first visual code when the first visual code is not within the field of view of the display.

What is claimed is:

1. An apparatus for image processing, the apparatus comprising:
a memory; and
a processor coupled to the memory and configured to:
    detect a first visual code in a first image of an environment;
    decode the first visual code;
    verify safety of contents of the first visual code;
    determine that contents of the first visual code are malicious;
    generate a first visual indication that the first visual code in the first image is potentially malicious; and
    output the first visual indication for display.

2. The apparatus of claim 1, wherein the processor is configured to:
    determine that the contents of the first visual code contain a uniform resource locator (URL); and
    prefetch data linked by the URL based on verifying the safety of the contents of the first visual code.

3. The apparatus of claim 2, wherein the prefetching is performed absent a request by a user to access the URL.

4. The apparatus of claim 2, wherein the first image depicts a portion of the environment that is not within a field of view of a display.

5. The apparatus of claim 4, wherein the processor is configured to determine whether to prefetch the first visual code when the first visual code is not within the field of view of the display.

6. The apparatus of claim 1, wherein the first visual indication that the first visual code is potentially malicious comprises an overlay indicating that the first visual code is potentially malicious.

7. The apparatus of claim 1, wherein the processor is configured to:
    detect a second visual code in the first image or in a second image;
    decode the second visual code;
    generate a second visual indication indicating that safety of the contents of the second visual code in the second image is verified; and
    output the second visual indication for display.

8. The apparatus of claim 1, wherein, to verify the safety of the contents of the first visual code, the processor is configured to:
    transmit the contents of the first visual code to a verification service; and
    receive, from the verification service, an indication that the safety of the contents of the first visual code is verified.

9. The apparatus of claim 8, wherein the verification service comprises at least one of a URL verification service or a proxy server.

10. The apparatus of claim 1, wherein, to verify the safety of the contents of the first visual code, the processor is configured to:
    determine that the first visual code is signed;
    determine that the first visual code includes an indication of a signing authority; and
    verify the safety of the contents of the first visual code based on the indication of the signing authority.

11. The apparatus of claim 10, wherein, to determine that the contents of the first visual code are malicious, the processor is configured to:
    compare the indicated identity of the signing authority to a list of trusted signing authorities;
    determine that the indicated identity of the signing authority is not in the list of trusted signing authorities; and
    determine the contents of the first visual code are malicious based on determining that the indicated identity of the signing authority is not in the list of trusted signing authorities.

12. The apparatus of claim 1, wherein the processor is configured to:
    detect a second visual code in the first image or in a second image;
    decode the second visual code;
    determine that contents of the second visual code contain textual information;
    determine that the textual information is appropriate; and output for display the textual information based on a determination that the textual information is appropriate.

13. The apparatus of claim 1, wherein the processor is configured to:

detect a second visual code in the first image or in a second image;

decode the second visual code;

determine that contents of the second visual code contain textual information;

determine that the textual information is potentially inappropriate; and output for display an altered version of the textual information based on a determination that the textual information is potentially inappropriate.

14. The apparatus of claim 1, wherein the first visual code comprises a quick response (QR) code.

15. The apparatus of claim 1, wherein, to verify the safety of the contents of the first visual code, the processor is configured to determine that the contents of the first visual code are potentially safe.

16. The apparatus of claim 1, wherein the processor is configured to obtain, from one or more image sensors, the first image of the environment.

17. A method for image processing, comprising:

detecting a first visual code in a first image of an environment;

decoding the first visual code;

verifying safety of contents of the first visual code;

determining that contents of the first visual code are malicious;

generating a first visual indication that the first visual code in the first image is potentially malicious; and outputting the first visual indication for display.

18. The method of claim 17, further comprising:

determining that the contents of the first visual code contain a uniform resource locator (URL); and prefetching data linked by the URL based on verifying the safety of the contents of the first visual code.

19. The method of claim 17, wherein verifying the safety of the contents of the first visual code comprises:

determining that the first visual code is signed;

determining that the first visual code includes an indication of a signing authority; and verifying the safety of the contents of the first visual code based on the indication of the signing authority.

20. The method of claim 19, wherein determining that the contents of the first visual code are malicious comprises:

comparing the indicated identity of the signing authority to a list of trusted signing authorities;

determining that the indicated identity of the signing authority is not in the list of trusted signing authorities; and determining the contents of the first visual code are malicious based on determining that the indicated identity of the signing authority is not in the list of trusted signing authorities.

\* \* \* \* \*